(12) United States Patent
Fujii et al.

(10) Patent No.: US 7,955,517 B2
(45) Date of Patent: Jun. 7, 2011

(54) POLISHING FLUID COMPOSITION

(75) Inventors: Shigeo Fujii, Wakayama (JP); Yoshiaki Oshima, Wakayama (JP); Koichi Naito, Tokyo (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 12/415,548

(22) Filed: Mar. 31, 2009

(65) Prior Publication Data

US 2009/0197415 A1 Aug. 6, 2009

Related U.S. Application Data

(62) Division of application No. 10/333,028, filed as application No. PCT/JP01/04728 on Jun. 5, 2001, now abandoned.

(30) Foreign Application Priority Data

Jul. 19, 2000 (JP) ................................ 2000-219605

(51) Int. Cl.
*C03C 15/00* (2006.01)
*B44C 1/22* (2006.01)
*H01L 21/302* (2006.01)

(52) U.S. Cl. ............. 216/89; 216/88; 438/692; 438/693

(58) Field of Classification Search ................. 438/692, 438/693; 216/88, 89
See application file for complete search history.

(56) References Cited

U.S. PATENT DOCUMENTS

| 5,302,368 A | 4/1994 | Harato et al. |
| 5,366,542 A | 11/1994 | Yamada et al. |
| 5,693,239 A * | 12/1997 | Wang et al. ..................... 216/88 |
| 5,697,992 A | 12/1997 | Ueda et al. |
| 5,709,588 A * | 1/1998 | Muroyama ..................... 451/41 |
| 5,759,917 A | 6/1998 | Grover et al. |
| 5,868,604 A | 2/1999 | Atsugi et al. |
| 5,876,490 A * | 3/1999 | Ronay ............................... 106/3 |
| 6,015,506 A | 1/2000 | Streinz et al. |
| 6,033,596 A | 3/2000 | Kaufman et al. |
| 6,046,110 A * | 4/2000 | Hirabayashi et al. ......... 438/693 |
| 6,139,763 A | 10/2000 | Ina et al. |
| 6,569,216 B1 | 5/2003 | Taira et al. |
| 6,945,851 B2 * | 9/2005 | Ward et al. ...................... 451/28 |
| 6,976,905 B1 * | 12/2005 | Fang et al. ....................... 451/41 |
| 2002/0062600 A1 | 5/2002 | Mandigo et al. |

FOREIGN PATENT DOCUMENTS

| JP | 04-363385 A | 12/1992 |
| JP | 10-102042 A | 4/1998 |
| JP | 10-342106 | * 12/1998 |
| JP | 10-342106 A | 12/1998 |
| JP | 11-092749 A | 4/1999 |
| JP | 11-293231 A | 10/1999 |
| JP | 2000-063805 A | 2/2000 |
| JP | 2000-109818 A | 4/2000 |
| JP | 2000-160142 A | 6/2000 |
| JP | 2001-089746 A | 4/2001 |
| WO | WO-00/32712 A1 | 6/2000 |

* cited by examiner

*Primary Examiner* — Shamim Ahmed

(74) *Attorney, Agent, or Firm* — Birch, Stewart, Kolasch & Birch, LLP

(57) ABSTRACT

To provide a polishing composition capable of increasing polishing rate and reducing surface roughness, without causing surface defects on a surface of an object to be polished; and a polishing process for a substrate to be polished. [1] a polishing composition comprising water, an abrasive, an intermediate alumina, and a polycarboxylic acid having 4 or more carbon atoms with no OH groups or a salt thereof, wherein a content of the intermediate alumina is from 1 to 90 parts by weight, based on 100 parts by weight of the abrasive; and [2] a polishing process for a substrate to be polished, comprising polishing a substrate to be polished under conditions that a composition of a polishing liquid during polishing is the composition as defined in item [1] above.

9 Claims, No Drawings

POLISHING FLUID COMPOSITION

This application is a Divisional of application Ser. No. 10/333,028 filed on Jan. 15, 2003, now abandoned, and for which priority is claimed under 35 U.S.C. §120. Application Ser.No. 10/333,028 is the national phase of PCT International Application No. PCT/JP01/04728 filed on Jun. 5, 2001 under 35 U.S.C. §371. The entire contents of each of the above-identified applications are hereby incorporated by reference.

TECHNICAL FIELD

The present invention relates to a polishing composition and a polishing process of a substrate to be polished.

BACKGROUND ART

With advancement of densification of hard disks, the floating amount of the magnetic head has become increasingly smaller. As a result, in the polishing step in hard disk substrates, there have been desired increase in the polishing rate and reduction in the surface roughness. Therefore, a polishing composition using water, alumina, boehmite, and a chelating compound, and a polishing process have been studied (Japanese Patent Laid-Open No. Hei 11-92749). However, this polishing composition has some but insufficient effects for increasing the polishing rate and for reducing surface defects such as scratches and pits. Also, its effects cannot also be said to be satisfactory for reduction in the surface roughness and for the planarization.

Also, even in the field of semiconductors, the finely sizing of a design room for a semiconductor device has been progressed with the advancements in high integration and high speeds, so that a focal depth becomes shallow during the process for manufacturing the device, whereby further demanding planarization of the pattern-forming surface.

DISCLOSURE OF INVENTION

An object of the present invention is to provide a polishing composition capable of increasing the polishing rate and reducing the surface roughness, without causing surface defects on a surface of an object to be polished; and a polishing process for a substrate to be polished.

Specifically, the present invention relates to:

[1] a polishing composition comprising water, an abrasive, an intermediate alumina, and a polycarboxylic acid having 4 or more carbon atoms with no OH groups or a salt thereof, wherein a content of the intermediate alumina is from 1 to 90 parts by weight, based on 100 parts by weight of the abrasive; and

[2] a polishing process for a substrate to be polished, comprising polishing a substrate to be polished under conditions that a composition of a polishing liquid during polishing is the composition as defined in item [1] above.

BEST MODE FOR CARRYING OUT THE INVENTION

As the abrasive used in the present invention, any abrasives generally employed for polishing can be used. Examples of the abrasive include metals; carbides, nitrides, oxides, or borides of metals or metalloids; diamond, and the like. The metal elements or metalloid elements include those elements belonging to the Groups 2A, 2B, 3A, 3B, 4A, 4B, 5A, 6A, 7A or 8 of the Periodic Table (long period form). Concrete examples of the abrasive include α-alumina particles, silicon carbide particles, diamond particles, magnesium oxide particles, zinc oxide particles, cerium oxide particles, zirconium oxide particles, colloidal silica particles, fumed silica particles, and the like. It is preferable to use one or more kinds of these abrasives, from the viewpoint of increasing the polishing rate. Among them, α-alumina particles, cerium oxide particles, zirconium oxide particles, colloidal silica particles, and fumed silica particles are suitable for polishing semiconductor wafers and semiconductor elements and substrates for precision parts such as substrates for magnetic recording media. Especially, the α-alumina particles are suitable for polishing a substrate for magnetic recording medium.

The average particle size of the primary particles of the abrasive is preferably from 0.01 to 3 μm, more preferably from 0.02 to 0.8 μm, especially preferably from 0.05 to 0.5 μm, from the viewpoint of increasing the polishing rate. Further, in the case where the primary particles are aggregated to form secondary particles, the average particle size of the secondary particles thereof is preferably from 0.05 to 2 μm, more preferably from 0.1 to 1.5 μm, especially preferably from 0.2 to 1.2 μm, similarly from the viewpoint of increasing the polishing rate and from the viewpoint of reducing the surface roughness of the object to be polished. The average particle size of the primary particles of the abrasive can be determined by carrying out image analysis by observation with a scanning electron microscope (magnification: preferably from 3000 to 30000 times) to determine an average particle size. In addition, the average particle size of the secondary particles can be determined as a volume-average particle size by using a laser beam diffraction method.

The specific gravity of the abrasive is preferably from 2 to 6, more preferably from 2 to 5, from the viewpoints of dispersibility, feeding ability and collecting and reusability for a polishing device.

The content of the abrasive is preferably from 1 to 40% by weight, more preferably from 2 to 30% by weight, more preferably from 3 to 15% by weight, of the polishing composition, from the viewpoints of economic advantages and reduction in the surface roughness, thereby making it possible to efficiently polish the object.

The term "intermediate alumina particles" as referred to in the present invention is a generic term referring to alumina particles other than the α-alumina particles. Concrete examples thereof include γ-alumina particles, δ-alumina particles, θ-alumina particles, η-alumina particles, κ-alumina particles, mixtures thereof, and the like. Among them, the following intermediate aluminas are preferable, from the viewpoints of the effects of increasing the polishing rate and reducing the surface roughness. Their crystal forms are preferably γ-alumina, δ-alumina, θ-alumina, mixtures thereof, and the like, more preferably γ-alumina, δ-alumina, mixtures thereof, especially preferably γ-alumina. In addition, their specific surface area (as determined by BET method) is preferably from 30 to 300 m$^2$/g, more preferably from 50 to 200 m$^2$/g. Their average particle size is preferably from 0.01 to 5 μm, more preferably from 0.05 to 5 μm, still more preferably from 0.1 to 3 μm, especially preferably from 0.1 to 1.5 μm. This average particle size can be determined as a volume-average particle size by using a laser beam diffraction method (for instance, a method using LA-920 manufactured by Horiba, LTD. as a measurement device). In addition, the content of the alkali metal and the alkaline earth metal is preferably 0.1% by weight or less, more preferably 0.05% by weight or less, especially preferably 0.01% by weight or less, of the intermediate alumina particles.

For instance, in a case where aluminum hydroxide, which has a relatively large specific surface area and a low content of the alkali metal and the alkaline earth metal, is used as a raw material, the fusion of the prepared intermediate alumina is small and the particle strength is small, so that there are no surface defects in the substrate to be polished, and thereby are especially effective for reducing the surface roughness.

The aluminum hydroxide used as a raw material for this purpose has a specific surface area of preferably 10 $m^2/g$ or more, more preferably 30 $m^2/g$ or more, especially preferably 50 $m^2/g$ or more. In addition, the aluminum hydroxide has a content of the alkali metal and the alkaline earth metal of preferably 0.1% by weight or less, more preferably 0.05% by weight or less, still more preferably 0.03% by weight or less, especially preferably 0.01% by weight or less. Furthermore, in the case where an intermediate alumina is prepared by subjecting aluminum hydroxide to thermal dehydration, forcible introduction of dry air or nitrogen gas during calcination is further effective in the reduction of the surface defects and the surface roughness of the substrate to be polished. Here, the above-mentioned thermal dehydration treatment can be carried out by an ordinary process.

These intermediate aluminas are adjusted to a given particle size by wet pulverization or dry pulverization by using a pulverizer such as a ball-mill, a beads-mill, a high-pressure homogenizer or a jet mill as occasion demands.

The aluminum hydroxide is represented by the formula $Al(OH)_3$, $AlOOH$, $AlOOH \cdot nH_2O$, or $Al_2O_3 \cdot nH_2O$, wherein n is 1 to 3, and is not particularly limited, as long as the aluminum hydroxide can prepare an intermediate alumina by thermal dehydration. Concrete examples thereof include gibbsite, bayerite, nordstrandite, diaspore, boehmite, pseudo-boehmite, alumino-gel, and the like.

Although the details of the function mechanism during the polishing of this intermediate alumina are unknown, the intermediate alumina has an accelerated effect of polishing and an effect of reducing the surface roughness, and also further improves the accelerated effect of polishing together with preventing surface defects such as pits, which are thought to be caused by a strong chemical action of the polycarboxylic acid having 4 or more carbon atoms with no OH groups or a salt thereof, which is one component of the polishing composition of the present invention, to the polished surface, whereby the surface roughness can be reduced.

Especially, the intermediate alumina particles used in the present invention are formulated as an additive in the polishing composition. By using the intermediate alumina particles together with the α-alumina particles used as the above-mentioned abrasive, there are exhibited excellent effects such as the accelerated polishing and the reduction in the surface roughness.

The content of the intermediate alumina in the polishing composition is from 1 to 90 parts by weight, preferably from 1 to 50 parts by weight, more preferably from 2 to 40 parts by weight, especially preferably from 4 to 30 parts by weight, based on 100 parts by weight of the abrasive, from the viewpoints of obtaining economic advantages, the accelerated effect of polishing, the effect of reducing the surface roughness, and the ability for preventing surface defects such as scratches and pits.

The lower limit of the content of the intermediate alumina in the polishing composition is 1 part by weight or more, based on 100 parts by weight of the abrasive, from the viewpoints of the accelerated effect of polishing, the effect of reducing the surface roughness, and the ability for preventing surface defects such as scratches and pits, and its upper limit is 90 parts by weight or less, based on 100 parts by weight of the abrasive, from the viewpoint of the accelerated effect of polishing.

As the polycarboxylic acid having 4 or more carbon atoms with no OH groups or a salt thereof used in the present invention (hereinafter referred to as the "polycarboxylic acid having no OH groups"), those polycarboxylic acids having 4 to 20 carbon atoms are preferable, more preferably 4 to 10 carbon atoms, especially preferably 4 to 6 carbon atoms, from the viewpoint of increasing the polishing rate. Also, the number of carboxyl groups is preferably from 2 to 10, more preferably from 2 to 6, especially preferably from 2 to 4, from the viewpoint of increasing the polishing rate. Concrete examples thereof include succinic acid, maleic acid, fumaric acid, glutaric acid, citraconic acid, itaconic acid, tricarballylic acid, adipic acid, and diglycolic acid; (meth)acrylic acid polymers; copolymers of (meth)acrylic acid with other monomers; and the like.

Among them, succinic acid, maleic acid, fumaric acid, glutaric acid, citraconic acid, itaconic acid, tricarballylic acid, adipic acid, and diglycolic acid are preferable, and succinic acid, maleic acid, fumaric acid, citraconic acid, itaconic acid, tricarballylic acid, and diglycolic acid are especially preferable.

The salt of these polycarboxylic acids having no OH groups is not particularly limited, as long as it is a salt capable of forming a salt with the polycarboxylic acid having no OH groups. Concretely, there are included salts with metals, ammonium, alkylammoniums, organic amines, and the like. Concrete examples of the metals include metals belonging to the Groups 1A, 1B, 2A, 2B, 3A, 3B, 4A, 6A, 7A and 8 of the Periodic Table (long period form). Among these metals, those belonging to the Groups 1A, 3A, 3B, 7A and 8 are preferable, from the viewpoint of increasing the polishing rate, and sodium and potassium belonging to the Group 1A, cerium belonging to the Group 3A, aluminum belonging to the Group 3B, manganese belonging to the Group 7A, and iron and cobalt belonging to the Group 8 are especially preferable, and aluminum belonging to the Group 3B, and iron and cobalt belonging to the Group 8 are most preferable. As to the salt of these polycarboxylic acids having no OH groups, a salt with a required metal may be previously formed, or a desired salt may be obtained by mixing an inorganic acid salt such as nitrate, sulfate or phosphate, or an organic acid salt such as acetate containing these metals with a polycarboxylic acid having no OH groups to carry out chelation exchange in the polishing composition.

Concrete examples of the alkylammoniums include tetramethylammonium, tetraethylammonium, tetrabutylammonium, and the like.

Concrete examples of the organic amines include dimethylamine, trimethylamine, alkanolamines, and the like.

It is preferable that the salt of the polycarboxylic acid having no OH groups is ammonium salts, sodium salts, potassium salts and aluminum salts of the polycarboxylic acid having no OH groups, from the viewpoint of increasing the polishing rate. Among them, the ammonium salts of the polycarboxylic acid having no OH groups are most preferable.

These polycarboxylic acids having no OH groups or salts thereof may be used alone, or in admixture of two or more kinds.

The content of the polycarboxylic acid having no OH groups or a salt thereof is preferably from 0.05 to 20% by weight, more preferably from 0.05 to 15% by weight, still more preferably from 0.1 to 15% by weight, especially preferably from 0.1 to 10% by weight, most preferably from 0.5 to 10% by weight, of the polishing composition, from the viewpoint of increasing the polishing rate. Also, the content of the polycarboxylic acid having no OH groups or a salt thereof is preferably from 10 to 1000 parts by weight, more preferably 20 to 300 parts by weight, especially preferably from 30 to 100 parts by weight, based on 100 parts by weight of the intermediate alumna simultaneously formulated therewith, from the viewpoints of obtaining an effect of reducing the surface roughness and an ability of preventing surface defects such as pits.

Water in the polishing composition of the present invention is used as a medium. The water content is from 40 to 98.94% by weight, preferably from 40 to 98% by weight, more preferably 50 to 97% by weight, especially preferably from 60 to 95% by weight or more, of the polishing composition, from the viewpoint that the substrate to be polished can be efficiently polished.

In addition, the polishing composition of the present invention can be formulated with other optional components as occasion demands. Other components are metal salts and ammonium salts of monomeric acid compounds; peroxides; thickening agents; dispersants; anticorrosive agents; basic substances; surfactants; chelating compounds; and the like. Concrete examples of the metal salts and ammonium salts of monomeric acid compounds, peroxides, thickening agents, and dispersants include those listed in Japanese Patent Laid-Open No. Sho 62-25187, page 2, upper right column, line 3 to upper right column, line 11; Japanese Patent Laid-Open No. Hei 1-205973, page 3, upper left column, line 11 to upper right column, line 2; Japanese Patent Laid-Open No. Hei 4-275387, page 2, right column, line 27 to page 3, left column, line 12; Japanese Patent Laid-Open No. Hei 5-59351, page 2, right column, line 23 to page 3, left column, line 37.

The chelating compound includes, for instance, hydroxycarboxylic acids, aminopolycarboxylic acids, amino acids and salts thereof. Here, the chelating compound is a compound having a multidentate ligand, capable of forming a complex by binding with a metal ion.

Among these chelating compounds, those having two or more carboxyl groups are preferable, from the viewpoint of increasing the polishing rate, and further aminopolycarboxylic acids are especially preferable.

It is desired that the number of carbon atoms of the hydroxycarboxylic acid is from 2 to 20, preferably from 2 to 12, more preferably from 2 to 8, still more preferably from 2 to 6, from the viewpoint of the solubility in water. Concrete examples thereof include glycolic acid, lactic acid, citric acid, gluconic acid, glyoxylic acid, tartaric acid, malic acid, and the like Regarding the aminopolycarboxylic acids, the number of amino groups in one molecule is preferably from 1 to 6, more preferably from 1 to 4, from the viewpoint of increasing the polishing rate. Also, the number of carboxylic acids is preferably from 1 to 12, more preferably from 2 to 8. In addition, the number of carbon atoms is preferably from 1 to 30, more preferably from 1 to 20. Concrete examples thereof include nitrilotriacetic acid, ethylenediaminetetraacetic acid, diethylenetriaminepentaacetic acid, hydroxyethylethylenediaminetetraacetic acid (HEDTA), triethylenetetraminehexaacetic acid (TIHA), dicarboxymethylglutamic acid (GLDA), and the like.

The amino acid has the number of carbon atoms of preferably from 2 to 20, more preferably the number of carbon atoms of more preferably from 2 to 10, from the viewpoint of increasing the polishing rate. Concrete examples thereof include glycine, alanine and the like.

Among them, malic acid, nitrilotriacetic acid, ethylenediaminetetraacetic acid, diethylenetriaminepentaacetic acid and glycine are preferable, and nitrilotriacetic acid, ethylenediaminetetraacetic acid and diethylenetriaminepentaacetic acid are more preferable, and ethylenediaminetetraacetic acid and diethylenetriaminepentaacetic acid are especially preferable.

In addition, the salt of these chelating compounds are the same as the above-mentioned salt of the polycarboxylic acid having no OH groups. Among them, salts formed between the aminopolycarboxylic acid and sodium and potassium belonging to Group 1A, cerium belonging to Group 3A, aluminum belonging to Group 3B, manganese belonging to Group 7A, and iron and cobalt belonging to Group 8, and an ammonium salt of the aminopolycarboxylic acid are preferable, from the viewpoint of increasing the polishing rate. Among them, salts formed between the aminopolycarboxylic acid and aluminum belonging to Group 3B and iron and cobalt belonging to Group 8 are most preferable.

These optional components can be used alone or in admixture of two or more kinds. In addition, the content of the optional components is preferably from 0.05 to 20% by weight, more preferably from 0.05 to 10% by weight, still more preferably from 0.05 to 5% by weight, of the polishing composition, from the viewpoint of increasing the polishing rate, from the viewpoint of exhibiting each of the functions, and from the viewpoint of economic advantages.

The concentration of each component of the above-mentioned polishing composition is a preferable concentration during polishing, and the concentration may be the concentration during the preparation of the composition. Usually, the composition is usually prepared as a concentrate, which is diluted upon use.

It is preferable that the pH of the polishing composition of the present invention is properly determined depending upon the kinds of the object to be polished, the required qualities and the like. For instance, the pH of the polishing composition of the present invention is preferably from 2 to 12, from the viewpoints of cleanability of the substrate to be polished and preventiveness of the corrosion of working machines. In addition, in the case where the object to be polished is a substrate for precision parts mainly made of a metal, such as an aluminum substrate produced by Ni—P plating, the pH of the polishing composition is preferably from 2 to 9, more preferably from 2 to 8, still more preferably from 3 to 8, especially preferably from 3 to 7, from the viewpoints of increasing the polishing rate and improving the surface qualities. Further, in a case where the polishing composition of the present invention is used for polishing semiconductor wafers and semiconductor elements, especially for polishing silicon wafers, polysilicon layers, and $SiO_2$ layers, the pH of the polishing composition is preferably from 7 to 12, more preferably from 8 to 12, especially preferably from 9 to 11, from the viewpoints of increasing the polishing rate and improving the surface qualities. The pH can be adjusted by properly adding an inorganic acid such as nitric acid or sulfuric acid, a metal salt or ammonium salt of a monomeric acid compound mentioned above, or a basic substance such as ammonia, an alkylamine, sodium hydroxide, or potassium hydroxide, in a desired amount as occasion demands.

The polishing process of a substrate to be polished of the present invention comprises polishing a substrate to be polished by using the polishing composition of the present invention, or preparing a polishing liquid by mixing each component so as to give the composition of the polishing composition of the present invention, and especially the substrate for precision parts can be favorably produced.

The material for the object to be polished includes, for instance, metals or metalloids such as silicon, aluminum, nickel, tungsten, copper tantalum, and titanium; alloys made of these metals as the main components; glassy substances such as glass, glassy carbon and amorphous carbons; ceramic materials such as alumina, titanium carbide, silicon dioxide, silicon nitride, tantalum nitride, and titanium nitride; resins such as polyimide resins; and the like. Among them, it is preferable that metals such as aluminum, nickel, tungsten and copper, and alloys made of these metals as the main components are the materials for the object to be polished, or semiconductor substrates such as semiconductor elements containing these metals are the materials for the object to be polished. Especially when the polishing composition of the present invention is used during the polishing of a substrate to be polished made of an Ni—P plated aluminum alloy, it is preferable, because the generation of surface defects such as scratches and pits is suppressed, so that the polishing can be carried out a fast rate with reducing the surface roughness as compared to that of the prior art.

The shapes for the objects to be polished are not particularly limited. For instance, those having shapes containing planar portions such as those in the forms of disks, plates, slabs and prisms, or shapes containing curved portions such as lenses can be subjects for polishing with the polishing composition of the present invention. Among them, the disc-shaped objects to be polished are especially excellent in polishing.

The polishing composition of the present invention can be favorably used especially in polishing the substrate for precision parts. For instance, the polishing composition is suitable for polishing substrates for magnetic recording media such as hard disks, optical disks, opto-magnetic disks, and the like; semiconductor substrates such as semiconductor wafers and semiconductor elements; photomask substrates; optical lenses, optical mirrors, half mirrors and optical prisms; and the like. Among them, the polishing composition is suitable for polishing the substrates for magnetic recording media and the semiconductor substrates, especially for polishing the hard disk substrates. The polishing of the semiconductor elements is carried out in, for instance, the step of polishing a silicon wafer (bare wafer), the step of flattening an interlayer insulating film, the step of forming an embedded metal line, the step of forming separation membrane for an embedded element, the step of forming an embedded capacitor, and the like.

By polishing the substrate to be polished in the manner described above, a substrate for precision parts or the like can be produced.

The polishing composition of the present invention especially has an effect in the polishing process, and the polishing composition can be similarly applied to the other polishing process, for instance, a lapping process or the like.

The present invention will be described in detail hereinbelow by means of Examples, without intending to limit the scope of the present invention thereto.

<Preparation Example 1 for Intermediate Alumina>

An alumina vessel (200 mm in length×100 mm in width×100 mm in height) was charged with 200 g of pseudo-boehmite particles having an average particle size of 20 μm, a specific surface area of 250 $m^2/g$, an alkali metal content of 0.005% by weight, and an alkaline earth metal content of 0.001% by weight. The pseudo-boehmite particles were baked in a muffle furnace at a baking rate of 50° C./minute, and a baking temperature of 600° C. for 4 hours with nitrogen gas stream at a flow rate of 5 L/minute, to give 140 g of an intermediate alumina. The intermediate alumina was transferred to a 2-L alumina ball-mill, and 327 g of ion-exchanged water was added thereto to prepare a 30% by weight slurry. Thereafter, 1000 g of alumina balls of 5 mm in diameters were introduced into the ball-mill to disrupt the slurry, and the disrupted slurry was then sieved to remove the alumina balls, to prepare 130 g of intermediate alumina particles. The prepared intermediate alumina particles were found to be γ-alumina having an average particle size of 0.7 μm, a specific surface area of 130 $m^2/g$, an alkali metal content of 0.0055% by weight, and an alkaline earth metal content of 0.0013% by weight.

Here, the average particle size of the intermediate alumina particles described in Preparation Example 1 mentioned above was determined as a volume-average particle size which was found on the basis of laser beam diffraction method using an analyzer LA-920 manufactured by Horiba LTD. The specific surface area was determined on the basis of BET method. The contents of an alkali metal and an alkaline earth metal in the intermediate alumina particles were determined on the basis of atomic absorption analysis and ICP emission analysis.

EXAMPLES 1 TO 3 AND COMPARATIVE EXAMPLES 1 TO 5

An abrasive (α-alumina having a primary average particle size of 0.25 μm, and a secondary average particle size of 0.7 μm (purity: about 99.9%), specific gravity: 4.0), an intermediate alumina, a salt of a polycarboxylic acid having 4 or more carbon atoms and having no OH groups, a pH adjusting agent (an aqueous ammonia or methanesulfonic acid), and ion-exchanged water were mixed and stirred, to prepare a polishing composition having the composition as shown in Table 1.

TABLE 1

| | α-Alumina | Intermediate Alumina | | Polycarboxylic Acid Having 4 or More Carbon Atoms and Having No OH Groups or Chelating Compound | | Ion-Exchanged Water and | |
|---|---|---|---|---|---|---|---|
| | Content (parts by weight) | | Content (parts by weight) | | Content (parts by weight) | pH Adjusting Agent (parts by weight) | pH |
| Ex. 1 | 8 | Prep. Ex. 1 | 1.5 | Maleic Acid | 1 | 89.5 | 6.5 |
| Ex. 2 | 8 | Prep. Ex. 1 | 1.5 | Itaconic Acid | 1 | 89.5 | 6.5 |
| Ex. 3 | 8 | Prep. Ex. 1 | 6 | Maleic Acid | 1 | 85 | 6.5 |
| Comp. Ex. 1 | 8 | None | — | None | — | 92 | 7.0 |
| Comp. Ex. 2 | 8 | Prep. Ex. 1 | 1 | None | — | 91 | 4.5 |
| Comp. Ex. 3 | 8 | None | — | Maleic Acid | 1 | 91 | 6.5 |

TABLE 1-continued

| | α-Alumina Content (parts by weight) | Intermediate Alumina | Content (parts by weight) | Polycarboxylic Acid Having 4 or More Carbon Atoms and Having No OH Groups or Chelating Compound | Content (parts by weight) | Ion-Exchanged Water and pH Adjusting Agent (parts by weight) | pH |
|---|---|---|---|---|---|---|---|
| Comp. Ex. 4 | 8 | Prep. Ex. 1 | 10 | Maleic Acid | 1 | 81 | 6.5 |
| Comp. Ex. 5 | 8 | Boehmite* | 1.5 | Maleic Acid | 1 | 89.5 | 6.5 |

*Boehmite: Manufactured by Nissan Chemical Industries, Ltd., "Alumina Sol-520"

Using each of the resulting polishing compositions, a substrate surface made of an Ni—P plated aluminum alloy, the substrate surface having an average surface roughness Ra of 0.1 μm, as determined by the following method, a thickness of 0.8 mm and a diameter of 3.5 inches was polished with a double-sided processing machine under the set conditions for double-sided processing machine given below, to give a polished object, which is an Ni—P plated, aluminum alloy substrate usable as a substrate for magnetic recording media.

The set conditions for double-sided processing machine are shown below.

Double-sided processing machine used: double-sided processing machine, Model 9B, manufactured by SPEED-FAM CO., LTD.
Processing pressure: 9.8 kPa
Polishing Pad: POLYTEX DG (manufactured by Rodel Nitta K.K.).
Disc rotational speed: 50 r/min
Feeding flow rate for a polishing composition: 100 mL/min
Polishing time period: 5 minutes
Number of substrate introduced: 10

After polishing, the thickness of an aluminum alloy substrate was determined, and a rate of decrease in the thickness was determined from the changes in the thickness of the aluminum alloy substrate before and after polishing. A relative value (relative rate) was determined on the basis of that of Comparative Example 1. The results are shown in Table 2.

In addition, average surface roughness Ra and scratches of each of the substrate surfaces after polishing were determined in the same manner as above, and pits were determined in accordance with the following methods. Incidentally, in Examples 1 to 3 and Comparative Examples 2 to 5, the relative value (relative roughness) was determined on the basis of that of Comparative Example 1. The results are shown in Table 2.

[Average Surface Roughness Ra (Relative Roughness)]

The average surface roughness was determined under the following conditions by using Talystep commercially available from Rank Taylor-Hobson Limited.
Size of tip end of profilometer: 25 μm×25 μm
By-pass filter: 80 μm
Measurement length: 0.64 mm

[Surface Defects (Scratches)]

Each of the substrate surfaces was observed with an optical microscope (differential interference microscope) with a magnification of 50 times at 6 locations at 60-degree intervals. The depth of the scratches was determined by Zygo (commercially available from Zygo). The evaluation criteria are as follows.

(Evaluation Criteria)
S: Scratches with a depth exceeding 50 nm are zero (0)/field.
A: Scratches with a depth exceeding 50 nm are less than 0.5/field on average.
B: Scratches with a depth exceeding 50 nm are 0.5 or more and less than 1/field on average.
C: Scratches with a depth exceeding 50 nm is 1 or more/field on average.

[Surface Defects (Pits)]

Each of the substrate surface was observed with an optical microscope (differential interference microscope) at a magnification of 200 times at an interval of 30 (for 12 locations, and the number of pits for the 12 fields was counted. The evaluation criteria are as follows.

(Evaluation Criteria)
S: 0
A: 1 to 3
B: 4 to 10
C: 10 or more

TABLE 2

| | Evaluation of Properties | | | |
|---|---|---|---|---|
| | Relative Rate | Relative Roughness | Surface Defects (Scratches) | Surface Defects (Pits) |
| Ex. 1 | 2.8 | 0.73 | S | S |
| Ex. 2 | 2.8 | 0.67 | S | S |
| Ex. 3 | 2.2 | 0.61 | S | S |
| Comp. Ex. 1 | 1 | 1 | C | B |
| Comp. Ex. 2 | 1.3 | 0.96 | B | S |
| Comp. Ex. 3 | 2.0 | 2.2 | C | B |
| Comp. Ex. 4 | 1.4 | 1.0 | A | S |
| Comp. Ex. 5 | 1.5 | 1.7 | A | B |

It is seen from the results in Table 2 that any of the polishing compositions obtained in Examples 1 to 3 has a higher polishing rate, and provides a substrate to be polished with a reduced surface roughness and with reduced surface defects such as scratches and pits, as compared to each of the polishing compositions obtained in Comparative Examples 1 to 5.

Also, it is seen from the results of Examples 1 to 3 and Comparative Example 4 that each of the polishing compositions (Examples 1 to 3) in which the content of the intermediate alumina in the polishing composition is from 1 to 90 parts by weight, based on 100 parts by weight of the abrasive has a higher polishing rate, and provides a substrate to be polished with a reduced surface roughness, as compared to the polishing composition (Comparative Example 4) in which the content of the intermediate alumina exceeds 90 parts by weight.

INDUSTRIAL APPLICABILITY

By using the polishing composition of the present invention, the polishing rate can be improved and the surface roughness can be reduced, without causing surface defects on the surface of an object to be polished. Therefore, a substrate for precision parts or the like can be produced.

The invention claimed is:

1. A polishing process for a substrate to be polished, comprising polishing a substrate to be polished by applying a polishing composition to the substrate, wherein the substrate is a Ni-P plated aluminum substrate, and
said composition comprises water, α-alumina, an intermediate alumina, and a polycarboxylic acid or salt thereof, said polycarboxylic acid being selected from the group consisting of maleic acid, fumaric acid, glutaric acid, citraconic acid, itaconic acid, tricarballylic acid, adipic acid, and diglycolic acid, wherein the intermediate alumina is present in an amount of from 4 to 75 parts by weight, based on 100 parts by weight of α-alumina in said composition, wherein said intermediate alumina is selected from the group consisting of γ-alumina, δ-alumina, θ-alumina, η-alumina, κ-alumina, and mixtures thereof.

2. The polishing process according to claim 1, wherein the intermediate alumina has a specific surface area of from 30 to 300 $m^2/g$ and an average particle size of from 0.01 to 5 mm.

3. The polishing process according to claim 2, wherein the intermediate alumina is prepared from aluminum hydroxide having a specific surface area of 10 $m^2/g$ or more and which has a content of an alkali metal and an alkaline earth metal of 0.1% by weight or less.

4. The polishing process according to claim 1, wherein the polycarboxylic acid is present in an amount ranging from 0.05 to 20% by weight based on the weight of the polishing composition.

5. The polishing process according to claim 2, wherein the polycarboxylic acid is present in an amount ranging from 0.05 to 20% by weight based on the weight of the polishing composition.

6. The polishing process according to claim 3, wherein the polycarboxylic acid is present in an amount ranging from 0.05 to 20% by weight based on the weight of the polishing composition.

7. The polishing process according to claim 1, wherein α-alumina is present in an amount of from 1 to 40% by weight, based on the weight of the polishing composition.

8. The polishing process according to claim 1, further including a chelating compound or salt thereof.

9. The polishing process according to claim 8, wherein said chelating compound is selected from the group consisting of hydroxycarboxylic acids, aminopolycarboxylic acids, amino acids, and salts thereof.

* * * * *